US 8,717,877 B2

(12) United States Patent
Li et al.

(10) Patent No.: US 8,717,877 B2
(45) Date of Patent: May 6, 2014

(54) METHOD FOR COMPLETING SMOOTH CUT-OVER, DEVICE AND EQUIPMENT FOR PERFORMING CUT-OVER OPERATIONS

(75) Inventors: E Li, Guangdong Province (CN); Shumei Gao, Guangdong Province (CN)

(73) Assignee: ZTE Corporation, Shenzhen, Guangdong Province (CN)

( * ) Notice: Subject to any disclaimer, the term of this patent is extended or adjusted under 35 U.S.C. 154(b) by 20 days.

(21) Appl. No.: 13/258,533

(22) PCT Filed: Jun. 28, 2010

(86) PCT No.: PCT/CN2010/074636
§ 371 (c)(1), (2), (4) Date: Sep. 22, 2011

(87) PCT Pub. No.: WO2011/094992
PCT Pub. Date: Aug. 11, 2011

(65) Prior Publication Data
US 2012/0294279 A1    Nov. 22, 2012

(30) Foreign Application Priority Data
Feb. 5, 2010 (CN) .......................... 2010 1 0111955

(51) Int. Cl.
*G01R 31/08* (2006.01)
(52) U.S. Cl.
USPC ........................ 370/220; 370/229; 370/242
(58) Field of Classification Search
USPC ......... 370/216, 217, 219, 220, 221, 225, 229, 370/242, 331
See application file for complete search history.

(56) References Cited

U.S. PATENT DOCUMENTS

| | | | |
|---|---|---|---|
| 6,097,951 A * | 8/2000 | Ernam et al. ................... | 455/433 |
| 6,408,182 B1 * | 6/2002 | Davidson et al. ............. | 455/433 |
| 6,839,829 B1 | 1/2005 | Daruwalla et al. | |
| 7,876,729 B1 * | 1/2011 | Grilli et al. ..................... | 370/332 |
| 2003/0207688 A1 * | 11/2003 | Nikkelen ....................... | 455/439 |
| 2004/0248592 A1 * | 12/2004 | Turina et al. .................. | 455/461 |

(Continued)

FOREIGN PATENT DOCUMENTS

| | | |
|---|---|---|
| CN | 101494551 A | 7/2009 |
| CN | 101567806 A | 10/2009 |
| CN | 101594706 A | 12/2009 |

OTHER PUBLICATIONS

International Search Report for PCT/CN2010/074636 Dated Nov. 11, 2010.

*Primary Examiner* — Kwang B Yao
*Assistant Examiner* — Nguyen Ngo
(74) *Attorney, Agent, or Firm* — Banner & Witcoff, Ltd.

(57) ABSTRACT

The present invention provides a method for completing smooth cut-over and a device and equipment for performing cut-over operations. The method comprises: when the device for performing cut-over operations maintains a first connection with the first cut-over device via a first interface, establishing a second connection with a second cut-over device via a second interface, and transferring the services carried on the connection resources between the device for performing cut-over operations and the first cut-over device, that is, the first connection resources, to the connection resources between the device for performing cut-over operations and the second cut-over device, that is, the second connection resources. The present invention does not interrupt services during the cut-over procedure, without affecting the normal service usage by the user, thus improving the security and reliability of cut-over.

11 Claims, 7 Drawing Sheets

(56) References Cited

U.S. PATENT DOCUMENTS

| | | |
|---|---|---|
| 2005/0143071 A1* | 6/2005 | Jaakkola et al. ............. 455/436 |
| 2007/0004412 A1* | 1/2007 | Henttonen et al. ........... 455/436 |
| 2008/0096547 A1* | 4/2008 | Zhang et al. ................. 455/424 |
| 2009/0082023 A1* | 3/2009 | Gustavsson .................. 455/445 |
| 2010/0255846 A1* | 10/2010 | Vikberg et al. .............. 455/436 |
| 2011/0212723 A1* | 9/2011 | Kunz et al. ................. 455/435.1 |
| 2012/0270554 A1* | 10/2012 | Hellwig et al. .............. 455/445 |

\* cited by examiner

METHOD FOR COMPLETING SMOOTH CUT-OVER, DEVICE AND EQUIPMENT FOR PERFORMING CUT-OVER OPERATIONS

TECHNICAL FIELD

The present invention relates to the field of wireless communication technologies, and more especially, to a method for completing smooth cutover, device and equipment for performing cutover operations.

BACKGROUND OF THE RELATED ART

CDMA (Code Division Multiple Access, referred to as CDMA) network provides services to a number of operators worldwide. As shown in FIG. 1, CDMA2000 network consists of the core network and the radio access network, wherein, the core network mainly consists of a mobile switching center (MSC), a visited location register (VLR), and a Home Location Register (HLR); the radio access network mainly consists of base station controllers (BSCs) and base transceiver stations (BTSs). The interface between the BSC and the MSC is known as A1/A2, A1 mainly refers to the control plane interface, and A2 mainly refers to the media plane interface (the interface A1/A2 sometimes is referred to as A interface in the field); the interface between the BSC and the BTS is called interface Abis, the interface between the BSCs is called interface A3/A7. CDMA2000 network can also provide packet data service, and the BSC connects with the Packet Control Function (referred to as PCF) via the interfaces A8 and A9, and the PCF connects with the packet data service node (referred to as PDSN) via the interfaces A10 and A11. With the IP-based evolution of CDMA2000 networks and the introduction of the concept soft switch, the interface A1/A2 can be replaced to IP mode from the traditional E1/T1 connectivity, FIG. 2 shows the networking when using the IP technology, where the MSC is split into two network elements: the mobile switching center emulation (MSCe) and the Media Gateway (MGW) dealing with control plane and media streaming respectively. The interface between the BSC and the MSCe is called interface A1p, and the interface between the BSC and the MGW is called interface A2p (similar to the interface A, the interface A1p/A2p is sometimes referred to as interface Ap).

Due to reasons such as the evolution of CDMA2000 networks, subscriber growth, and operator business strategy, sometimes it needs to replace or upgrade some network elements or equipments in the existing network or to change the connection relationship between the network elements and the equipments. For example, sometimes it needs to replace the core network, that is, update the core network equipment without changing the radio network. This requires cutting over the interfaces A1 and A2 in CDMA2000 networks, that is, disconnecting the BSC from the current MSC/MSCe and then connecting it to another new MSC/MSCe. For another example, sometimes it needs to transfer the BTS from one BSC to another BSC to reduce the burden of the current BSC or replace the BTS with a new BSC. For still another example, sometimes it needs to upgrade the interface A to the interface Ap to enjoy various advantages brought by applying the packet switching technology into the CDMA2000 network.

Generally, the operation of changing the connection relationship between network elements or equipments or replacing the network elements is called cutover in the field. In the equipment cutover or replacement process, the commonly used method is to disconnect the old connection, and then create a new connection. Because this process involves the disconnection and reconnection in the control plane and the media plane, the user services will inevitably be interrupted. The Chinese invention patent application whose application number is 200810004333.6 discloses a method and device for reducing the service interruption interval in the service cutover process, but the method still has the "service interruption" issue. Service interruption inevitably brings some negative effects and reduces the user's satisfaction. Despite the cutover process can be controlled in the shortest possible time and with minimized impact on users with careful planning and thorough preparation, this short break sometimes is difficult to accept with the increasing user requirements.

CONTENT OF THE INVENTION

The present invention provides a method for completing smooth cutover, device and equipment for performing cutover operations to ensure the cutover process not interrupt the services or affect the user's normal use, so as to improve the safety and reliability of the cutover.

In order to solve the aforementioned technical problem, the present invention provides a method for completing smooth cutover, comprising: when the device for performing cutover operations maintains a first connection with a first cutover device via a first interface, establishes a second connection with a second device via a second interface, and transfer the services carried in the connection resources between the device for performing cutover operations and the first cutover device, that is, the first connection resources, to the connection resources between the device for performing cutover operations and the second cutover device, that is, the second connection resources.

The aforementioned method also might have the following feature:

The services that need to be carried in the first connection resources are transferred several times to the second connection resources, each transfer operation comprises: block part of the first connection resources, when the services occupying this part of resources are completed and the resource state changes to idle, disconnect the physical connection corresponding to this part of resources from the first cutover device and connect the resources to said second cutover device, new services to be carried in this part of resources are routed to the second cutover device.

The aforementioned method might also have the following feature:

The blocking operation comprises: block new services from being allocated to the blocked resources, but not affecting the services established in the resources; the cases of the resource state being idle comprise: the user actively releases the services carried in the resources, the system allocates new resources to services carried in the resources, or the vacancy rate of the resources reaches user acceptance level.

The aforementioned method might also comprise:

When the first connection resources are a physically inseparable and independent entity, after the device for performing cutover operations establishes the second connection with the second cutover device via the second interface, route new services to be carried in the first connection resources to the second cutover device.

The aforementioned method might also have the following feature:

The first and second cutover devices are the same type of devices, or different types of devices being able to provide the same functionality.

The aforementioned method might also have the following feature:

The device for performing cutover operations is a base station controller; the first and second cutover devices are mobile switching centers; the first and second interfaces are the A-interface in the code division multiple access system, or the first interface is the A interface in the code division multiple access system, the second interface is the Ap interface in the code division multiple access system.

In order to solve these technical problem, the present invention also provides a device for performing cutover operations to complete smooth cutover, the device is configured to: when maintaining a first connection with a first cutover device via a first interface, establish a second connection with a second cutover device via a second interface, transfer the services carried in the connection resources between the device for performing cutover operations and the first cutover device, that is, the first connection resources, to the connection resources between the device for performing cutover operations and the second cutover device, that is, the second connection resources.

The aforementioned device for performing cutover operations might also have the following feature:

The services that need to be carried in the first connection resources are transferred by the device for performing cutover operations for several times to the second connection resources, and each transfer operation comprises: block part of the first connection resources, when the services occupying this part of resources are completed and the resource state changes to idle, disconnect the physical connection corresponding to this part of resources from the first cutover device and connect the resources to said second cutover device, and route new services to be carried in this part of resources to the second cutover device.

The aforementioned device for performing cutover operations might also have the following feature:

The blocking operation comprises: block new services from being allocated to the blocked resources, but not affecting the services established in the resources; the cases of the resource state being idle comprise: the user actively releases the services carried in the resources, the system allocates new resources to services carried in the resources, or the vacancy rate of the resources reaches user acceptance level.

The aforementioned device for performing cutover operations might also comprise:

When the first connection resources are a physically inseparable and independent entity, after the device for performing cutover operations establishes the second connection with the second cutover device via the second interface, route new services to be carried in the first connection resources to the second cutover device.

The aforementioned device for performing cutover operations might also have the following feature:

The first and second cutover devices are the same type of devices, or different types of devices being able to provide the same functionality.

The aforementioned device for performing cutover operations might also have the following feature:

The device for performing cutover operations is a base station controller; the first and second cutover devices are mobile switching centers; the first and second interfaces are the A-interface in the code division multiple access system, or the first interface is the A interface in the code division multiple access system, the second interface is the Ap interface in the code division multiple access system.

In order to solve these technical problem, the present invention also provides an equipment for performing cutover operations to complete smooth cutover, the equipment comprises: a routing selection module, configured to: when maintaining a first connection with a first cutover device via a first interface, establish a second connection with a second cutover device via a second interface, and a resource transfer operation module, configured to transfer the services carried in the connection resources between the device for performing cutover operations and the first cutover device, that is, the first connection resources, to the connection resource between the device for performing cutover operations and the second cutover device, that is, the second connection resources, so as to let the device for performing cutover operations complete the smooth cutover.

The aforementioned equipment might also have the following feature:

The services that need to be carried in the first connection resources are transferred by the device for performing cutover operations for several times to the second connection resources, and each transfer operation comprises: block part of the first connection resources, when the services occupying this part of resources are completed and the resource state changes to idle, disconnect the physical connection corresponding to this part of resources from the first cutover device and connect the resource to said second cutover device, and route new services to be carried in this part of resources to the second cutover device; the blocking operation comprises: block new services from being allocated to the blocked resources, but not affecting the services established in the resources; the cases of the resource state being idle comprise: the user actively releases the services carried in the resources, the system allocates new resources to services carried in the resources, or the vacancy rate of the resources reaches user acceptance level.

The aforementioned equipment might also comprise:

The resource transfer operation module is also configured to: when the first connection resources are a physically inseparable and independent entity, after the device for performing cutover operations establishes the second connection with the second cutover device via the second interface, route new services to be carried in the first connection resources to the second cutover device.

Compared with the prior art, the technical scheme of the present invention does not interrupt the services in the cutover process or affect the normal use of the services by the users, so as to reduce the cutover risk, improve the cutover safety and reliability, system service quality and user satisfaction.

PREFERRED EMBODIMENTS OF THE PRESENT INVENTION

Figure 1:
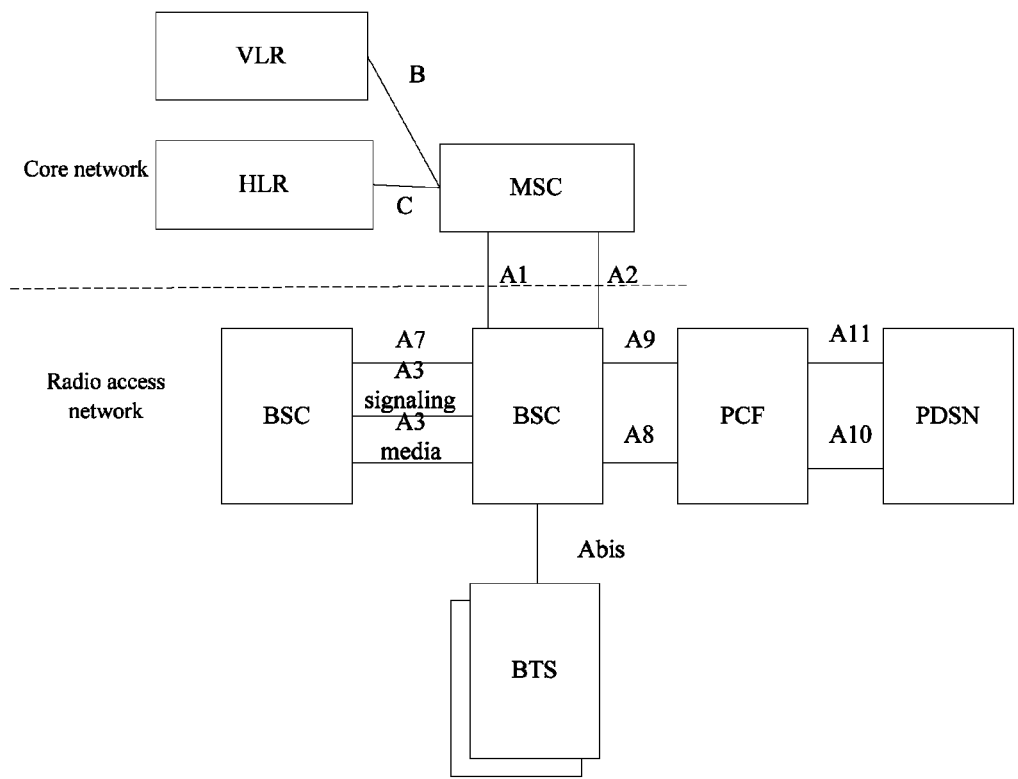
FIG. 1 is a schematic diagram of CDMA2000 networking when the A-interface is based on the circuit-switched network.
Figure 2:
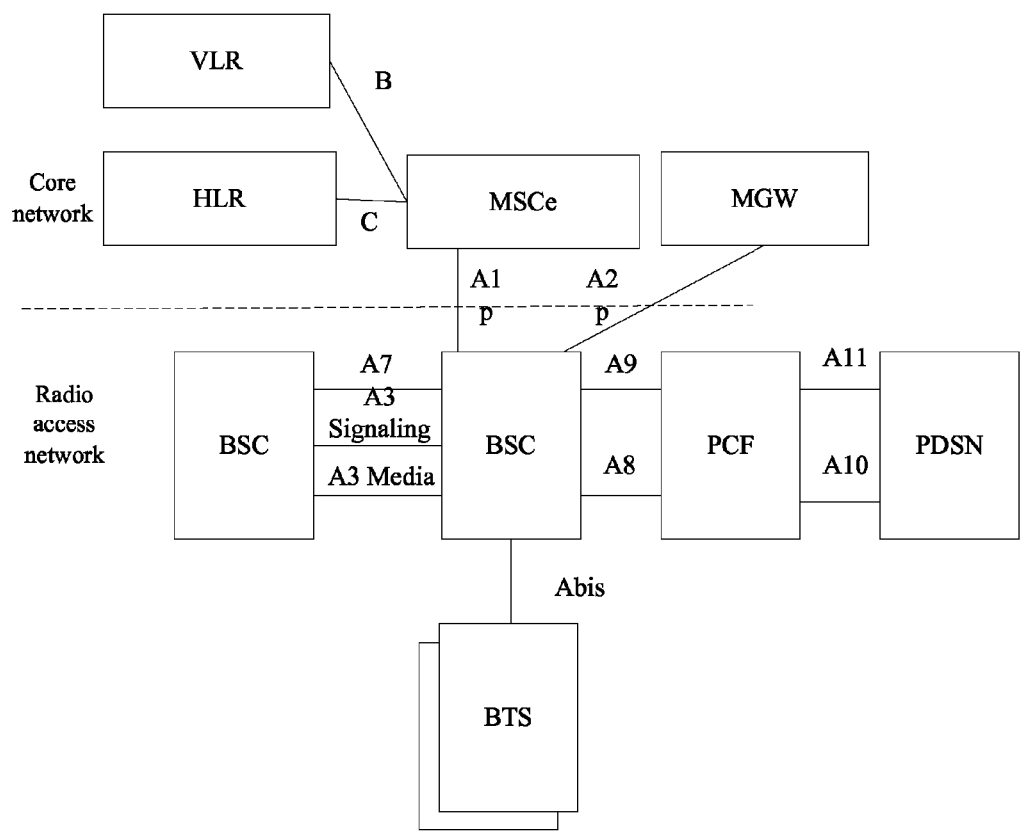
FIG. 2 is a schematic diagram of CDMA2000 networking when the A-interface is based on the packet-switched network.
Figure 3:
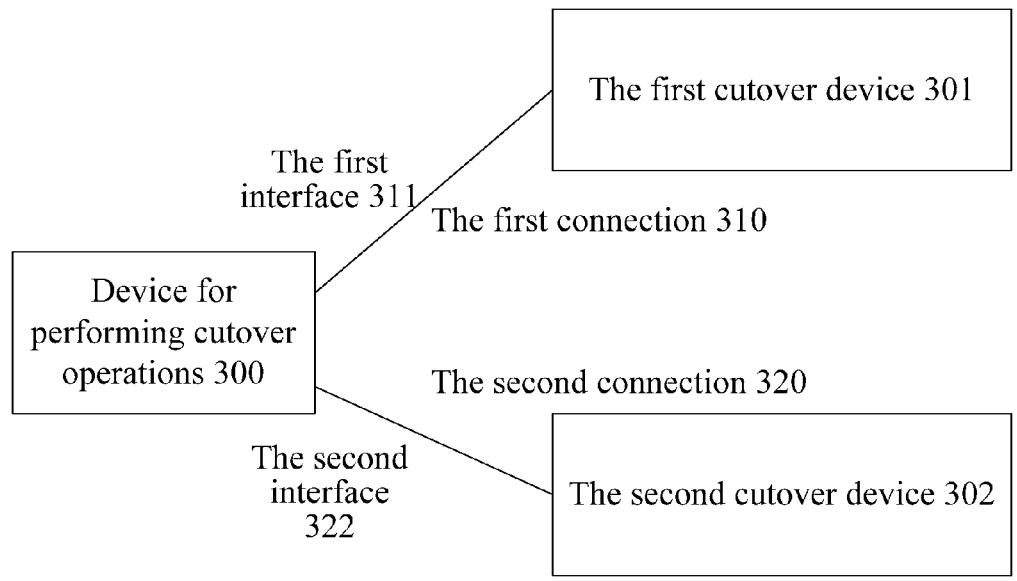
FIG. 3 is a schematic diagram of the connection and composition of the device for performing cutover operations in accordance with the present invention.

As shown in FIG. 3, the device for performing cutover operations 300 to complete a smooth cutover establishes the first connection 310 with the first cutover device 301 via the first interface 311, or establishes the second connection 320 with the second cutover device 302 via the second interface 322.

The first cutover device 301 and the second cutover device 302 might be the same type of devices or different types of devices providing the same functionality. Correspondingly, the first interface 311 and the second interface 322 might be the same type of interfaces or the same type series of interfaces, such as the A interface and the Ap interface in CDMA2000; also can be different types of interfaces providing the same connection functionality, such as, one used for the fixed access (such as the V5 interface), the other for the mobile access network (such as A/Ap interface).

The device for performing cutover operations 300 supports the first interface 311 and the second interface 322 at the same time, and has the capability of connecting to the first cutover device 301 and the second cutover device 302, implemented by the relevant physical connection units and software modules.

The device for performing cutover operations 300 also comprises a routing selection module, and the routing selection module selects to connect to the first cutover device 301 or the second cutover device 302 according to the configured routing selection policy when it needs the first cutover device 301 or the second cutover device 302 to provide services.

The service routing function of the routing selection module can use but not limited to the following policies:

1) According to the identification information of the user requesting for the service, using the random method or the specified hashing method to share the service to two interfaces.

2) According to the location information of the user requesting for the service, using the random method or the specified hashing method to share the service to two interfaces.

The purpose of the routing selection function is to make the device for performing cutover operations allocate all the services carried by itself to the two interfaces according to a certain proportion. Therefore, any algorithm that can distinguish the services according to a certain attribute of the services so as to carry these services on different interfaces can be used as the routing selection function here.

The device for performing cutover operations 300 also has the management function of the media plane on the first interface 311 and the second interface 322, such as blocking or unblocking some bearer resources at these interfaces. The media plane resource of these interfaces is a set of multiple physical or logical resource units for the interfaces carried services, such as IP (Internet Protocol) address, port number, or resource indicated by the resource ID of the interfaces. In general, the resources are shared by all users, that is, the resources and the users served by the device for performing cutover operations 300 have no one-by-one corresponding relationship. It needs to have relevant protocols to specify the resource allocation and negotiation methods at the interfaces, and the device for performing cutover operations 300, the first cutover device 301 and the second device 302 should have the functions of managing and manipulating these resources, that is, they can allocate, block or unblock part of the resources as desired. Herein, the resource blocking means prevent new services from being allocated to the blocked resources, while not affecting the services already established in this part of resources, thus no service interruption due to the blocked resources.

The device for performing cutover operations 300 is configured to, when maintaining the first connection 310 with the first cutover device 301 via the first interface 311, establish the second connection 320 with the second cutover device 302 via the second interface 322, and transfer the services carried in the connection resources between the device for performing cutover operations 300 and the first cutover device 301, that is, the first connection resources, to the connection resources between the device for performing cutover operations 300 and the second cutover device 302, that is, the second connection resources.

In the first embodiment, the device for performing cutover operations 300 is also configured to, transfer the services to be carried in the first connection resources for several times to the second connection resources, and each transfer operation comprises: block part of the first connection resources, when the services occupying this part of resource are completed and the resource state changes to idle, disconnect the physical connection corresponding to this part of resource from the first cutover device and connect this part of resource to said second cutover device 302, and route new services to be carried in this part of resources to the second cutover device 302. Wherein, the blocking operation comprises: block new services from being allocated to the blocked resources, but not affecting the services established in the resources; the cases of the resource state being idle comprise: the user actively releases the services carried in the resources, the system allocates new resources to services carried in the resources, or the vacancy rate of this resources reaches user acceptance level.

In the second embodiment, the device for performing cutover operations 300 is also configured to, when the first connection resources is a physically inseparable and independent entity, after establishing the second connection 320 with the second cutover device 302 via the second interface 322, route new services to be carried in the first connection resources to the second cutover device 302.

When each aforementioned devices are used in the CDMA system, typically, the device for performing cutover operations 300 is a base station controller, the first cutover device 301 and the second cutover device 302 are mobile switching centers, the first and second interfaces are the A interfaces in the CDMA system, or the first interface 311 is the A interface in the CDMA system and the second interface 322 is the Ap interface in the CDMA systems. Alternatively, the device for performing cutover operations 300 is a base station transceiver, and the first cutover device 301 and the second cutover device 302 are base station controllers.

The present invention also provides an equipment for performing smooth cutover which can be installed in the device for performing cutover operations to make the device for performing cutover operations complete the smooth cutover. This equipment comprises a routing selection module and a resource transfer operation module.

The routing selection module is configured to, when maintaining the first connection with the first cutover device via the first interface, establish the second connection with the second cutover device via the second interface.

The resource transfer operation module is configured to, transfer the services carried in the connection resources between the device for performing cutover operations and the first cutover device, that is, the first connection resources, to the connection resources between the device for performing cutover operations and the second cutover device, that is, the second connection resources, thus the device for performing cutover operations completes the smooth cutover.

The resource transfer operation module is also configured to, transfer the services to be carried in the first connection resources for several times to the second connection resources, and each transfer operation comprises: block part of the first connection resources, when the services occupying this part of resource are completed and the resource state changes to idle, disconnect the physical connection corresponding to this part of resource from the first cutover device and connect the resource to said second cutover device, and route new services to be carried in this part of resources to the second cutover device. Wherein, the blocking operation comprises: block new services from being allocated to the blocked resources, but not affecting the services established in the resources; the cases of the resource state being idle comprise: the user actively releases the services carried in the resource, the system allocates new resources to services carried in the resources, or the vacancy rate of this resources reaches user acceptance level.

The resource transfer operation module is also configured to, when the first connection resource is a physically inseparable and independent entity, after the routing selection module establishes the second connection with the second cutover device via the second interface, route new services to be carried in the first connection resources to the second cutover device.

In this embodiment, the method for completing smooth cutover comprises: when the device for performing cutover operations maintains the first connection with the first cutover device via the first interface, it establishes the second connection with the second cutover device via the second interface, and transfers the services carried in the connection resources between the device for performing cutover operations and the first cutover device, that is, the first connection resources, to the connection resources between the device for performing cutover operations and the second cutover device, that is, the second connection resources.

Figure 4:
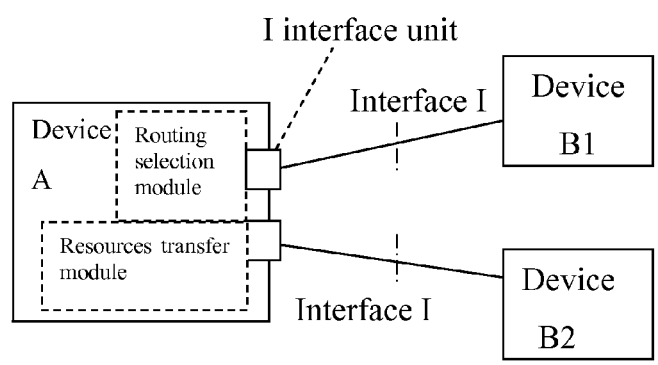
FIG. 4 is a schematic diagram of device networking in the cutover process in the present invention.

As shown in FIG. 4, suppose the devices A and B are connected with each other via the interface I in normal operation state, the interface I is implemented in both the device A and the device B. Now it needs to replace the device B with another device with the same type (device hardware upgrade, or replace with device from different vendors), this replacement process will need to disconnect the I interface between the device A and the original device B, and then connect the device A and the new device B via a new I interface. To facilitate the description, hereinafter the original device B (to be replaced device) is referred to as B1, and the new device B (replacing device) is referred to as B2.

In the first embodiment, transfer the services to be carried in the first connection resources for several times to the second connection resources, and each transfer operation comprises: block part of the first connection resources, when the services occupying this part of resources are completed and the resource state changes to idle, disconnect the physical connection corresponding to this part of resources from the first cutover device and connect the resources to said second cutover device, and route new services to be carried in this part of resources to the second cutover device.

Figure 5:
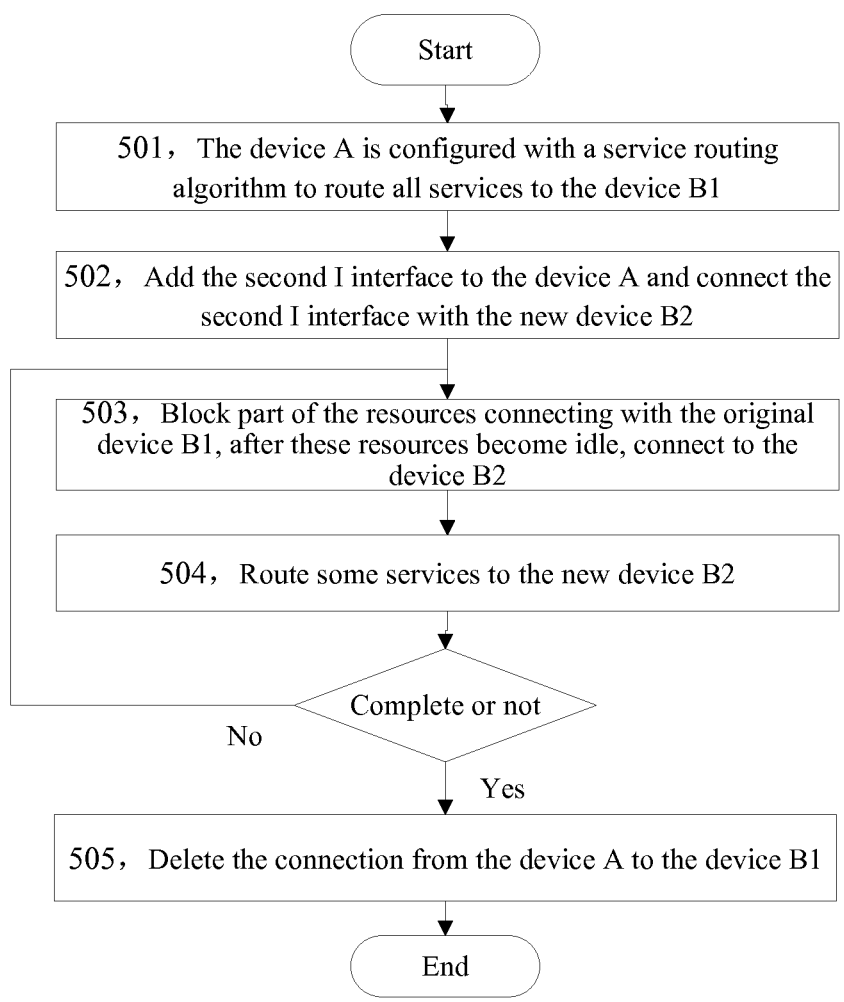
FIG. 5 is a flow chart of smooth cutover in accordance with the first embodiment of the present invention.

As shown in FIG. 5, the method in the first embodiment comprises the following steps:

Step 501, the device A is configured with a service routing algorithm to route all services to the device B1.

Step 502, add the second I interface to the device A and connect with the new device B2.

Step 503, use the resource management function of the I interface to block part of the I interface resources between the device A and the device B1, so that the newly launched services are no longer assigned to these bearer resources, while the established services are not affected, after the services using these resources all end, these resources become idle (for example, the user actively releases the resources, or re-allocate new resources according to the I interface protocol), or the vacancy rate reaches user acceptance (for example, only very few users are still not released), then disconnect the physical connection corresponding to this part of the resources from the device B1 and reconnect to the device B2.

The blocking operation means preventing new services from being allocated to the blocked resources, while not affecting the services already established in the resources; the resources state being idle means that the user actively releases the services carried in the resources, or the system allocates new resources to the services carried in these resources, or the vacancy rate of the resources reaches the user acceptance level.

Step 504, modify the service routing of the device A, and route the services provided by the device A to the device B2, then the device B1 and the device B2 at this time share the services.

Repeat the above steps 503,504 for two or more times, and finally cut all the resources over to the device B2, and route all the services to the device B2. There is no substantial difference between repeating two times and repeating more than two times, the total number of times is primarily limited to the cutover operation workload and resource utilization. Since the cutover resources are blocked and unavailable in the cutover process, it requires that the total number of resources has a certain amount of redundancy during the cutover in order to reduce the impact on services, the amount of resources in a single cutover can be estimated according to the number of the redundant resources. The specific implementation policy and the number of repetitions can be adjusted according to actual situation, but they should not deviate from the scope of the present invention.

In step 504, the adjustment of the service routing algorithm should match the cutover progress of the resources to ensure that there is no phenomenon of a lot of congestions due to the lack of resources in the devices B1 and B2.

Step 505, delete the connection between the device A and the device B1, complete the cutover.

The first embodiment is established on the basis that the bearer resources of the I interface are multiple separable physical entities, and if the bearer resources of the I interface are an individual and inseparable entity and are only logically divided into multiple units (such as UDP (User Datagram Protocol) port number), that I interface is established successfully also means that the corresponding resources are all ready, then in the second embodiment, when the first connection resources are a physically inseparable and independent entity, after the device for performing cutover operations establishes the second connection with the second cutover device via the second interface, route the new services to be carried in the first connection resources to the second cutover device.

Figure 6:
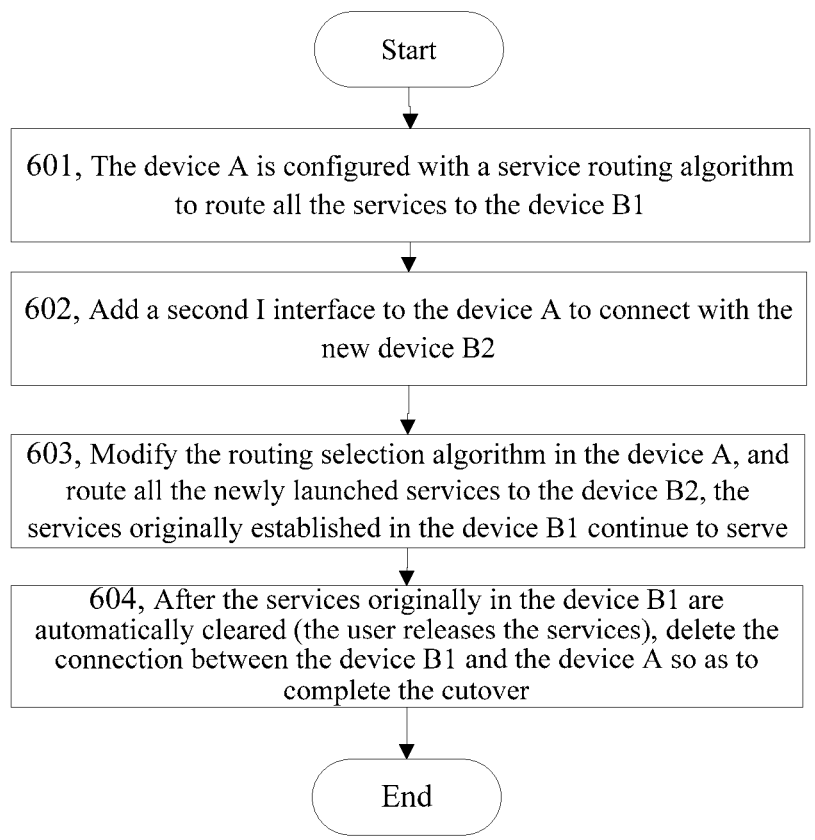
FIG. 6 is a flow chart of smooth cutover in accordance with the second embodiment of the present invention.

As shown in FIG. 6, the method in the second embodiment comprises the following steps:

Step 601, the device A is configured with a service routing algorithm to route all the services to the device B1;

Step 602, add a second I interface to the device A to interconnect with the new device B2;

Step 603, modify the routing selection algorithm in the device A, and route all the newly launched services to the device B2, the services originally established in the device B1 continue to serve;

Step 604, after the services originally in the device B1 are automatically cleared (the user releases the services), delete the connection between the device B1 and the device A so as to complete the cutover.

The present invention can be applied to the cutover of each interface in the CDMA2000 network, with the following drawings and specific embodiments, the technical scheme of the present invention will be described in further detail in the following. Note that the specific embodiments described here are only used to illustrate the present invention and should not be considered superior to other embodiments.

The First Specific Embodiment

Figure 7:
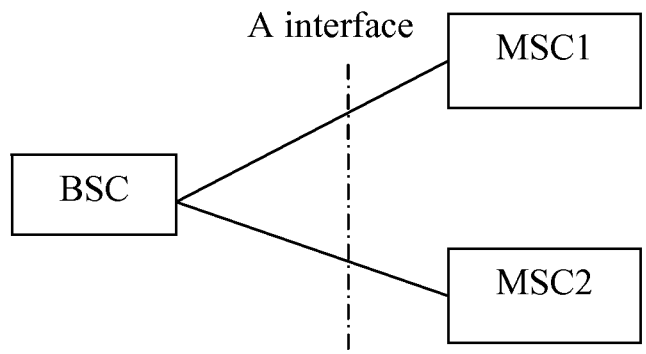
FIG. 7 is a diagram of networking in the A interface cutover process in the first specific embodiment of the present invention.

FIG. 7 is a diagram of networking in the A interface cutover process in the CDMA2000 network. Wherein, MSC1 denotes the original core network device connecting with the BSC via an A interface. The MSC2 is a new device to replace the MSC1. The BSC connects to the MSC1 and the MSC2 simultaneously via two A interfaces. The BSC implements the service routing function, selects an MSC to provide users with services for each new call according to the configured policy, and provides an optional backup function, that is, when one MSC fails, or the corresponding A interface fails, route all the services to another MSC. The A interface physically consists of multiple E1/T1 circuits (sometimes referred to as PCM (Pulse Code Modulation) circuit in the field), some time slots of some circuits carry signaling link and the rest carry media stream. CIC (Circuit Identity Code) is used to identify the time slots of each PCM circuit at the A interface, and the bandwidth of each time slot is 64 kbps, carrying one voice call. The CIC is the A interface resources, according to the 3GPP2 (3rd Generation Partnership Project 2) standard, the CIC resources can be managed by blocking or unblocking commands in the BSC.

According to the present invention, in this embodiment, the BSC system needs to provide two A interfaces, that is, one BSC provides the capability of simultaneously accessing to two MSCs via the A interface, comprising:

A. Provide the capability of connecting to two SS7 point;

B. Provide the service routing function, select one of two MSCs to provide services to the users according to a certain routing policy.

C. Provide the management function of two A interface ground circuits.

Wherein, the service routing function in the BSC can use but not limited to the following policies:

Select the MSC according to the CI (Cell Identifier).

Select the MSC by using a Hash algorithm according to IMSI (International Mobile Station Identifier).

Wherein, the service routing function in the BSC also provides the following function: when one MSC (A Interface) fails, all services can be automatically routed to another MSC.

Those skilled in the field should easily understand that, the service routing policy can be implemented with other algorithms, for example, select the direction of signaling by taking the ESN (Electronic Serial Number) of the user device as the input parameters in the hash algorithm, or directly select the direction of signaling randomly based on each call, as long as the algorithm can share the load between two MSCs, this algorithm can be used. Using different algorithms here should not deviate from the scope of the present invention.

Figure 8:
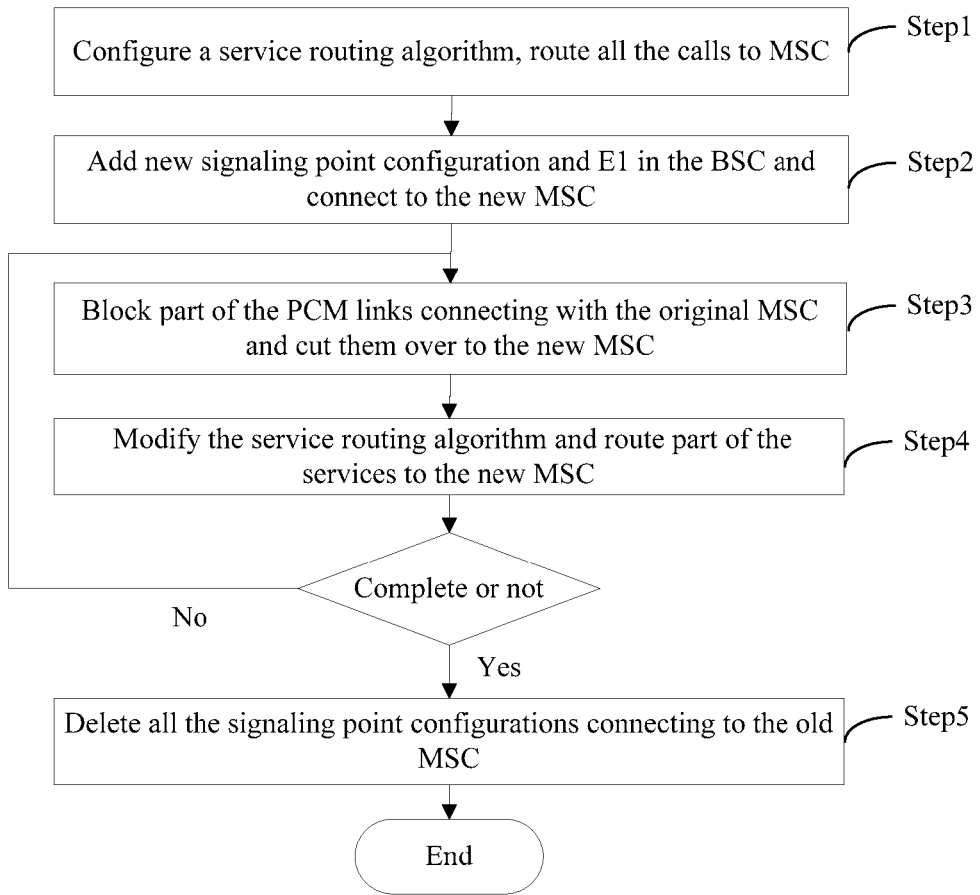
FIG. 8 is a flow chart of the A interface cutover in the first specific embodiment of the present invention.

FIG. 8 shows the steps of using the present invention to perform the A interface cutover:

Step 1: Configure a service routing algorithm in the BSC, route all the services to MSC1. This step is a preparation for the cutover to ensure that the services are not affected in the process of testing to connect to the A interface link in the MSC2.

Step 2: configure a second A interface in the BSC, and connect to the MSC2. The purpose of this step is to make the link from the BSC to the MSC2 available by adding or modifying the configuration and physical connection, all the services are tested in this step to ensure that the MSC2 can work normally.

Step 3: block part of the PCM links between the BSC to the MSC1 so that new services will no longer be allocated to the PCM links, while the already established services can continue to be used. After the services in the blocked links are automatically cleared, disconnect these PCM links from the MSC1 and connect these PCM links to the MSC2.

Step 4: Modify the service routing algorithm in the BSC, route part of the services to the MSC2. At this time, the MSC2 already works normally, rationally allocate the routing algorithm according to the number of PCM links so that the service load in the two MSCs is comparable to the proportion of the number of normally connected PCM links.

According to the service traffic and the number of PCM links, repeat the steps 3 and 4 two or more times, until all the PCM circuits are disconnected from the MSC1, and connected to the MSC2.

Step 5: the A interface configuration from the BSC to the MSC1 has been set aside, after the MSC2 works properly and there is no need to have the MSC1 backup, the A interface data connecting to the MSC1 can be to delete. After this step, the whole A interface cutover ends.

The Second Specific Embodiment

Figure 9:
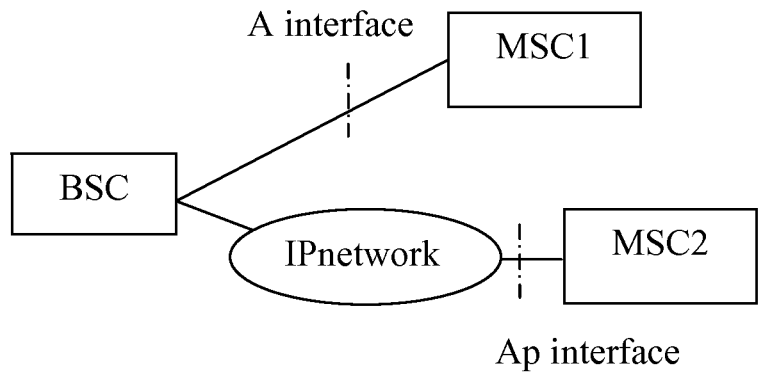
FIG. 9 is a diagram of networking in the Ap interface cutover process in the second specific embodiment of the present invention.
Figure 10:
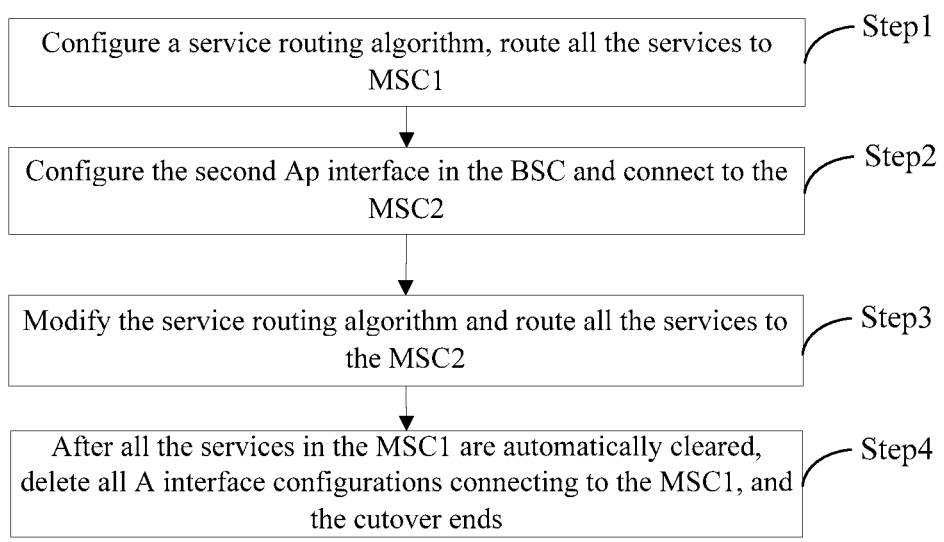
FIG. 10 is a flow chart of the Ap interface cutover in the second specific embodiment of the present invention.

When cutting the A interface based on the E1/T1 bearer over to the Ap interface (as shown in FIG. 9) based on the IP bearer, as well as cutting the Ap interface based on the IP bearer to the Ap interface based on the IP bearer, or cutting over the Ap interface based on the IP bearer to the A interface based on the E1/T1 bearer, since the bearing method is different and is not related to the physical cutover of the A interface resources (PCM circuit), the steps are simpler. In the following, take cutting the A interface over to the Ap interface for example to illustrate the cutover steps in the present invention (as shown in FIG. 10):

Step 1: Configure a service routing algorithm, route all the services to MSC 1. This step is a preparation for the cutover to ensure that the services are not affected in the process of testing to connect to the A interface link in the MSC2.

Step 2: configure a second A interface in the BSC and connect the second A interface to the MSC2. The purpose of this step is to make the link from the BSC to the MSC2 available by adding or modifying the configuration and physical connection, all the services are tested in this step to ensure that the MSC2 can work normally.

Step 3: Modify the service routing algorithm, route all the new services to the MSC2, while maintain the originally established services unchanged.

Step 4: After all the services in the MSC1 are automatically cleared (the call automatically ends) after the A interface configuration connecting to the MSC1 is deleted completely. The cutover ends.

The method for completing the smooth cutover of the A interface in the CDMA2000 network based on the present invention is described above. Those skilled in the field should understand that, this cutover method can also be applied to interfaces such as Abis, A8/A9, A10/A11, A3/A11, although the specific functions and features of a variety of interfaces are different, the scheme described in the present invention can be applied in the cutover process to keep the services not interrupted in the cutover process, so as to achieve smooth and secure cutover.

It can be understood by those skilled in the field that some or all steps in the abovementioned method can be fulfilled by instructing the relevant hardware components with a program, and said program can be stored in a computer readable storage media such as read only memory, magnetic disk or optical disk. Optionally, some or all steps in the abovementioned embodiment can be implemented with one or more integrated circuits. Correspondingly, each module/unit in the abovementioned embodiment can be implemented in the form or hardware or in the form of software function module, or their combinations.

The above description is only the preferred embodiments rather than the restriction of the present invention, for those skilled in the field, the description of the above scheme can be modified or improved. Without departing from the spirit and essence of the present invention, all these types of modification or variations should belong to the scope of the claims of the present invention.

INDUSTRIAL APPLICABILITY

The method for completing smooth cutover, device and equipment for performing cutover operations provided in the present invention do not interrupt the services in the cutover process or affect the normal use of the services by the users, so as to reduce the cutover risk, improve the cutover safety and reliability, system service quality and user satisfaction.

What is claimed is:

1. A method for completing smooth cutover, comprising:
when a device for performing cutover operations maintains a first connection with a first cutover device via a first interface, establishing a second connection with a second cutover device via a second interface, and transferring services carried in connection resources between the device for performing cutover operations and the first cutover device, that is, first connection resources, to connection resources between the device for performing cutover operations and the second cutover device, that is, second connection resources;
wherein, the services that need to be carried in the first connection resources are transferred in a plurality of times to the second connection resources, each transfer operation comprises: blocking part of the first connection resources, when the services occupying this part of resources are completed and a state of the resources changes to idle, disconnecting a physical connection corresponding to this part of resources from the first cutover device and connecting this part of resources to said second cutover device, and routing new services to be carried in this part of resources to the second cutover device;
wherein, the blocking part of the first connection resources comprises: blocking new services from being allocated to the blocked resources, but not affecting the services established in the resources; and the state of the resources changing to idle comprises: a user actively releasing the services carried in the resources, a system allocating new resources to services carried in the resources, or vacancy rate of this resources reaching a user acceptance level.

2. The method of claim 1, the method further comprising:
when the first connection resources is a physically inseparable and independent entity, after the device for performing cutover operations establishes the second connection with the second cutover device via the second interface, routing new services to be carried in the first connection resources to the second cutover device.

3. The method of claim 2, wherein,
the first and the second cutover devices are a same type of device, or different types of devices being able to provide a same functionality.

4. The method of claim 1, wherein,
the first and the second cutover devices are a same type of device, or different types of devices being able to provide a same functionality.

5. The method of claim 1, wherein,
the device for performing cutover operations is a base station controller; the first and the second cutover devices are mobile switching centers; the first and the second interfaces are A-interfaces in a code division multiple access system, or the first interface is an A interface in the code division multiple access system, the second interface is an Ap interface in the code division multiple access system.

6. A device for performing cutover operations to complete smooth cutover, wherein, the device is configured to:
when maintaining a first connection with a first cutover device via a first interface, establish a second connection with a second cutover device via a second interface, transfer services carried in connection resources between the device for performing cutover operations and the first cutover device, that is, first connection resources, to connection resources between the device for performing cutover operations and the second cutover device, that is, second connection resources;
wherein, the services that need to be carried in the first connection resources are transferred by the device for performing cutover operations for a plurality of times to the second connection resources, and each transfer operation comprises: blocking part of the first connection resources, when the services occupying this part of resources are completed and a state of the resources changes to idle, disconnecting a physical connection corresponding to this part of resources from the first cutover device and connecting the part of resources to said second cutover device, and routing new services to be carried in this part of resources to the second cutover device;
wherein, the blocking part of the first connection resources comprises: blocking new services from being allocated to the blocked resources, but not affecting the services established in the resources; and the state of the resources changing to idle comprises: a user actively releasing the services carried in the resources, a system allocating new resources to the services carried in the resources, or vacancy rate of this resources reaching a user acceptance level.

7. The device for performing cutover operations of claim 6, wherein, the device is further configured to:

when the first connection resources is a physically inseparable and independent entity, after the device for performing cutover operations establishes the second connection with the second cutover device via the second interface, route new services to be carried in the first connection resources to the second cutover device.

8. The device for performing cutover operations of claim 6, wherein, the first and the second cutover devices are a same type of device, or different types of devices being able to provide a same functionality.

9. The device for performing cutover operations of claim 6, wherein, the device for performing cutover operations is a base station controller; the first and the second cutover devices are mobile switching centers; the first and the second interfaces are A-interfaces in a code division multiple access system, or the first interface is an A interface in a code division multiple access system, the second interface is an Ap interface in a code division multiple access system.

10. An equipment for performing cutover operations to complete smooth cutover, wherein, the equipment comprises:

a routing selection module, configured to: when maintaining a first connection with a first cutover device via a first interface, establish a second connection with a second cutover device via a second interface; and a resource transfer operation module, configured to transfer services carried in connection resources between the equipment for performing cutover operations and the first cutover device, that is, first connection resources, to connection resources between the equipment for performing cutover operations and the second cutover device, that is, second connection resources, so as to let the equipment for performing cutover operations complete the smooth cutover;

wherein, the services that need to be carried in the first connection resources are transferred by the equipment for performing cutover operations for a plurality of times to the second connection resources, and each transfer operation comprises: blocking part of the first connection resources, when the services occupying this part of resources are completed and state of the resources changes to idle, disconnecting a physical connection corresponding to this part of resources from the first cutover device and connecting the resources to said second cutover device, and routing new services to be carried in this part of resources to the second cutover device;

the blocking part of the first connection resources comprises: blocking new services from being allocated to the blocked resources, but not affecting the services established in the resources;

and the state of the resources changing to idle comprises: a user actively releasing the services carried in the resources, a system allocating new resources to services carried in the resources, or a vacancy rate of this resources reaching a user acceptance level.

11. The equipment of claim 10, wherein, the resource transfer operation module is also configured to: when the first connection resource is a physically inseparable and independent entity, after the equipment for performing cutover operations establishes the second connection with the second cutover device via the second interface, routing new services to be carried in the first connection resource to the second cutover device.

* * * * *